United States Patent
Phan et al.

(10) Patent No.: US 12,317,085 B2
(45) Date of Patent: May 27, 2025

(54) METHOD FOR DETECTING THAT A SECURE ELEMENT HAS BEEN TEMPORARILY DISCONNECTED FROM A DEVICE, AND CORRESPONDING DEVICE

(71) Applicant: THALES DIS FRANCE SAS, Meudon (FR)

(72) Inventors: Ly Thanh Phan, Gemenos (FR); Vincent Dany, Gemenos (FR); Mireille Pauliac, Gemenos (FR)

(73) Assignee: THALES DIS FRANCE SAS, Meudon (FR)

( * ) Notice: Subject to any disclaimer, the term of this patent is extended or adjusted under 35 U.S.C. 154(b) by 672 days.

(21) Appl. No.: 17/419,002

(22) PCT Filed: Jan. 2, 2020

(86) PCT No.: PCT/EP2020/050041
§ 371 (c)(1),
(2) Date: Jun. 28, 2021

(87) PCT Pub. No.: WO2020/144101
PCT Pub. Date: Jul. 16, 2020

(65) Prior Publication Data
US 2022/0104023 A1    Mar. 31, 2022

(30) Foreign Application Priority Data
Jan. 7, 2019    (EP) .................................... 19305014

(51) Int. Cl.
| | |
|---|---|
| *H04L 29/06* | (2006.01) |
| *H04W 8/20* | (2009.01) |
| *H04W 12/126* | (2021.01) |
| *H04W 12/30* | (2021.01) |
| *H04W 12/75* | (2021.01) |
| *H04W 52/02* | (2009.01) |

(52) U.S. Cl.
CPC ......... *H04W 12/126* (2021.01); *H04W 8/205* (2013.01); *H04W 12/35* (2021.01); *H04W 12/75* (2021.01); *H04W 52/0209* (2013.01)

(58) Field of Classification Search
CPC ... H04W 12/126; H04W 12/75; H04W 12/35; H04W 8/205
See application file for complete search history.

(56) References Cited

U.S. PATENT DOCUMENTS

| | | | |
|---|---|---|---|
| 8,874,077 B2 | 10/2014 | Bergenwall | |
| 2012/0289193 A1* | 11/2012 | Bergenwall | H04W 12/45 455/410 |
| 2014/0038601 A1* | 2/2014 | Gouriou | H04W 8/18 455/435.1 |

OTHER PUBLICATIONS

Technical specification; 3GPP TS 31.121 V15.2; Dec. 2018, 3 pages (Year: 2018).*
3rd Generation Partnership Project: Technical Specification Group Core Networks and Terminals; UICC-terminal interface; Universal Subscriber Identity Module (USIM) application test specification (Release 15), Dec. 20, 2018, 3 pages.
International Search Report (PCT/ISA/210) and Written Opinion (PCT/ISA/237) mailed on Mar. 27, 2020, by the European Patent Office as the International Searching Authority for International Application No. PCT/EP2020/050041.
Qualcomm Incorporated: "Alignment of UICC polling interval with eDRX cycle", vol. CT WG6, No. Anaheim, U.S., Nov. 18, 2015, 1 page.
Samsung et al., "Proposed text on Power Consumption for TR 22.817", vol. SA WG1, No. Nice, May 3, 2021, 1 page.

* cited by examiner

*Primary Examiner* — Wasika Nipa

(57) ABSTRACT

A method for detecting that a removable secure element has been temporarily disconnected from a first device includes: Providing by the secure element to the first device a first Temporal Global Identity; Entering the first device in the sleeping mode; If the secure element is inserted and used by a second device during the sleeping mode of the first device, replacing in the secure element the first Temporal Global Identity by a second Temporal Global Identity and providing the second Temporal Global Identity to the second device; When getting out from the sleeping mode by the first device, reading by the first device the Temporal Global Identity stored in the secure element; If the Temporal Global Identity read is not the same than the stored Temporal Global Identity, sending to an MNO server a message to indicate that the secure element has been used by another device.

1 Claim, No Drawings

METHOD FOR DETECTING THAT A SECURE ELEMENT HAS BEEN TEMPORARILY DISCONNECTED FROM A DEVICE, AND CORRESPONDING DEVICE

The present invention concerns telecommunications and in particular M2M (Machine to Machine) communications comprising terminals or devices cooperating with removable secure elements, like UICCs (Universal Integrated Circuit Cards) for example.

Typically, a M2M device cooperates with a secure element like a UICC. The M2M device is for example a counter, like a gas or electric counter. The M2M device registers for example the consumption of electricity or gas of an apartment or house and sends periodically the amount of gas or electricity that has been used by the family who is leaving in this apartment or house.

However, in order to save energy, the M2M device is not always powered on: It takes measures from time to time and sends regularly information to a MNO (Mobile Network Operator) who handles the connectivity with the secure element.

So, for terminals that use a card (UICC) to access a telecom network it is possible for the terminal to intermittently switch off the card to save power. These use cases occur for instance when the terminal enters in Power Saving Mode (PSM) and/or enters extended idle mode (eDRX) in LTE/5G. These use cases can be found here:
https://www.ceva-dsp.com/ourblog/cellular-iot-power-saving-techniques-how-do-the-new-cat-m1-and-cat-nb1-protocols-achieve-ultra-low-energy-consumption/
where it is specified:
Power Saving Mode (PSM):

The UE PSM was introduced in Release 12. To maximize the downtime of the UE, it performs periodic tracking area update (TAU) after which it stays reachable for paging during a configurable window of idle time. Once the window of idle time passes, the device becomes dormant and is unreachable until the next periodic TAU. This power saving method is especially important for use cases that require sparse periodic reporting, for example once a day.
Extended Discontinuous Reception (eDRX):

Discontinuous reception (DRX) specified a sleep period of up to 10.24 s between paging cycle, to reduce power consumption. The new extended version, eDRX, now enables the UE to sleep a predefined number of hyper frames (HF) of 10.24 s before becoming available to receive traffic from the network. The maximum number of HFs that a device can request, adds up to about 40 minutes of extended sleep for Cat-M1 and almost three hours for Cat-NB1.

So, during these phases, not only the card is switched off but the terminal also deactivates the UICC presence detection mechanism. Consequently, when the terminal is in these modes of operation, it is possible for a malignant agent to remove the card from the original terminal and use it fraudulently in another terminal, before the original terminal could detect the removal of the card.

In normal operation, when the terminal goes out of these modes, it is supposed to verify the content of some files accordingly to the existing standard for example the file EF_Loci.

These verifications increase the level of confidence that the card is the same as the one before the power was removed: Same identity and EF_xLoci have not been changed.

However, this only guaranties that the card is the same but not the fact that it has not been used elsewhere, as original EF_xLoci files may be restored by an illegitimate user/terminal. This is even more critical in 5G, as 5G files may not be stored in the UICC but in the terminal. In such case the terminal can only rely on the identities of the card (IMSI/ICCID).

Moreover some of those EF are optional and this might reduce the number of checks.

So, the problems with these verification procedure as specified today by 3GPP are:
Terminal has to verify several files, that increase the power-on again time (wake up time), thus resulting in more power consumption;
Even with these verifications, the legitimate terminal has no way today to be 100% sure that the card has not been fraudulently used elsewhere during power off (sleeping mode).

The present invention proposes a solution to this problem.

More precisely, the invention proposes a method for detecting at the level of a first device and at the level of a MNO server that a removable secure element has been temporarily disconnected from the first device with which the removable element is cooperating, the first device entering during a lap of time in a sleeping mode, the method comprising:

A—Providing by the secure element to the first device a Temporal Global Identity, called first Temporal Global Identity, on demand by the first device, before the first device enters in the sleeping mode and storing the first Temporal Global Identity in a memory of the first device;

B—Entering the first device in the sleeping mode;

C—If the secure element is inserted and used by a second device during the sleeping mode of the first device, the use consisting in an action different from a reading of the first Temporal Global Identity, replacing in the secure element the first Temporal Global Identity by a second Temporal Global Identity different from the first Temporal Global Identity, providing the second Temporal Global Identity to the second device and storing the second Temporal Global Identity in a memory of the second device;

D—When getting out from the sleeping mode by the first device, reading by the first device the Temporal Global Identity stored in the secure element;

E—If the Temporal Global Identity read at step -D- is not the same than the Temporal Global Identity stored at step -A-, sending by the first device to the MNO server a message in order to inform him that the secure element has been used by another device.

The Temporal Global Identity should be at least a 128-bit long code and is changed by the secure element at least before the first device enters in the sleeping mode.

The invention also concerns a device, called first device, the first device comprising an application comprising instructions able to:

A—Request by the first device to a removable secure element of the first device a Temporal Global Identity called first Temporal Global Identity before the first device enters in a sleeping mode and storing the first Temporal Global Identity in a memory of the first device;

B—When getting out from the sleeping mode by the first device, request by the first device the first Temporal Global Identity to the secure element;

C—If the Temporal Global Identity read at step -B- is not the same than the Temporal Global Identity stored at step -A-, send a message to the MNO handling the secure element in order to inform him that the secure element has been used by another device.

The present invention will be better understood by reading the following description of a preferred implementation of the invention.

The invention proposes a method for detecting at the level of a first device and at the level of a MNO server that a removable secure element has been temporarily disconnected from the first device with which the removable element is cooperating. The first device enters during a lap of time in a sleeping mode (PSM or eDRX for example) during which the first device deactivates the UICC presence detection mechanism.

According to the invention, it is proposed to:

A—Provide by the secure element to the first device a Temporal Global Identity, called first Temporal Global Identity, on demand by the first device, before the first device enters in this sleeping mode and to store the first Temporal Global Identity in a memory of the first device;

B—Enter the first device in the sleeping mode;

C—If the secure element is inserted and used by a second device during the sleeping mode of the first device, this use consisting in an action different from a reading of the first Temporal Global Identity, replace in the secure element the first Temporal Global Identity by a second Temporal Global Identity different from the first Temporal Global Identity, provide the second Temporal Global Identity to the second device and store the second Temporal Global Identity in a memory of the second device;

D—When getting out from the sleeping mode by the first device, reading by the first device the Temporal Global Identity stored in the secure element;

E—If the Temporal Global Identity read at step -D- is not the same than the Temporal Global Identity stored at step -A-, send by the first device to the MNO server a message in order to inform him that the secure element has been used by another device.

So, according to the invention, a card (removable UICC) is configured with the capability to provide the terminal with a 'Temporal Global Identity' or TGId, called 'First Temporal Global Identity' or FTGId on demand by the first terminal.

The FTGId should be at least a 128-bit code and should change often enough to provide appropriate confidence level.

The FTGId may be the result of the hash of concatenation of permanent identity of the UICC (e.g. ICCID, IMSI, SUPI . . . ) and temporary result of USIM operation like authentication (e.g. counters of all the authentication keys, RES, CK, IK, Kc . . . ). Entropy could be extended by adding, before hashing, a random.

Another possibility could be to randomly regenerate the FTGId on first command after ATR.

Before the terminal deactivates the presence detection of the card, the terminal gets the FTGId from the card and stores this FTGId in a terminal's secure memory.

Then the terminal powers-off the card during the sleeping mode.

After power-on and/or reactivation of the card, in order to check whether the card has been illicitly used, the terminal gets the TGId from the card and verifies this TGld is equal to the one stored in the terminal's secure memory. The TGId is not modified if a simple Read command of the TGId is sent to the UICC.

An illicit use may be considered as being detected when any an action different from a reading of the first Temporal Global Identity are executed, including for example a Resume command, a Read command of the IMSI or of a Loci file, a Run GSM command, a Selection GSM command, a Run Authenticate command, a Select AF Usim command, . . .

If the TGIds are the same then the terminal can be 100% sure that the UICC card has not been removed and used fraudulently elsewhere. Otherwise, the terminal can be 100% sure that the card has been used elsewhere and in such case, would need to take adequate actions, for example deregister the device from the network and perform a new registration to the network.

It may fire an alert message towards the device management server.

In power saving mode, the device may go into deep sleep with card presence detection deactivated for days to weeks. For instance this is the case for gas tank level sensors that sends on a weekly basis the level of liquefied gas remaining in the tank. The device needs to work for several years before the battery is changed.

In such case, during the several days period, the UICC could be removed and used in other devices fraudulently.

The invention allows the legitimate device to detect the use of the USIM in other devices, when it is powered on again.

Preferably, the TGId is at least a 128-bit long code and is changed by the first device at least before entering in the sleeping mode. This code is for example generated randomly.

The invention also concerns a device, called first device, the first device comprising an application comprising instructions able to:

A—Requesting by the first device to a removable secure element of the first device a Temporal Global Identity called first Temporal Global Identity before the first device enters in a sleeping mode and storing the first Temporal Global Identity in a memory of the first device;

B—When getting out from the sleeping mode by the first device, request by the first device the first Temporal Global Identity to the secure element;

C—If the Temporal Global Identity read at step -B- is not the same than the Temporal Global Identity stored at step -A-, send a message to the MNO handling the secure element in order to inform him that the secure element has been used by another device.

This application is shared between the secure element and the devices. The devices have all the same behavior (they all contain the same application).

The invention claimed is:

1. A method for detecting by a first device and by a MNO server that a removable secure element has been temporarily disconnected from said first device, said first device entering during a lap of time in a sleeping mode, said method comprising:

A—Providing by said removable secure element to said first device a Temporal Global Identity, called first Temporal Global Identity, on demand by said first device, before said first device enters in said sleeping mode and storing said first Temporal Global Identity in a memory of said first device;

B—Entering said first device in said sleeping mode;

C—If said removable secure element is inserted and used by a second device, wherein the second device is a different entity from said first device during the sleeping mode of said first device, said use consisting in an action different from a reading of said first Temporal Global Identity, replacing in said removable secure element said first Temporal Global Identity by a second Temporal Global Identity different from said first Temporal Global Identity, providing said second Temporal Global Identity to said second device and storing said second Temporal Global Identity in a memory of said second device;

D—When getting out from said sleeping mode by said first device, reading by said first device the Temporal Global Identity stored in said removable secure element;

E—If the Temporal Global Identity read at step -D- is not identical to the Temporal Global Identity stored at step -A-, sending by said first device to said MNO server a message in order to inform said MNO server that said removable secure element has been used by another device and deregister said first device from network and perform a new registration to the network;

wherein said Temporal Global Identity is at least a 128-bit long code and is changed by said removable secure element at least before said first device enters in said sleeping mode and the code is generated randomly;

wherein said Temporal Global Identity is not modified if a simple READ command of the said Temporal Global Identity is sent to said removable secure element.

* * * * *